April 1, 1969  N. F. FYLER  3,436,510
ELECTRON BEAM MACHINING APPARATUS FOR PRODUCING
HIGH DEFINITION ENCODERS
Filed June 14, 1967 Sheet 1 of 3

INVENTOR:
Norman F. Fyler
By Ronald M. Goldman
ATTORNEY

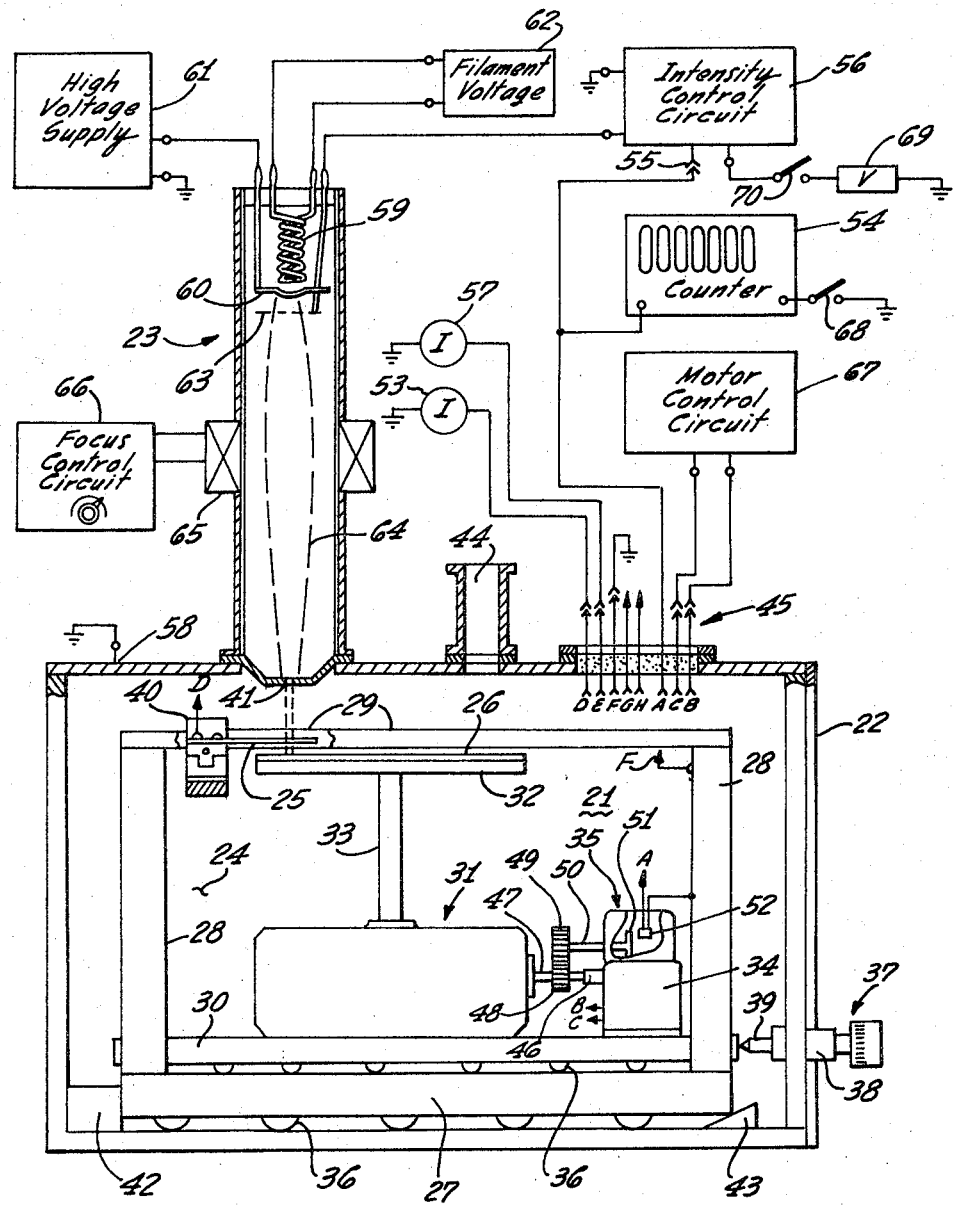

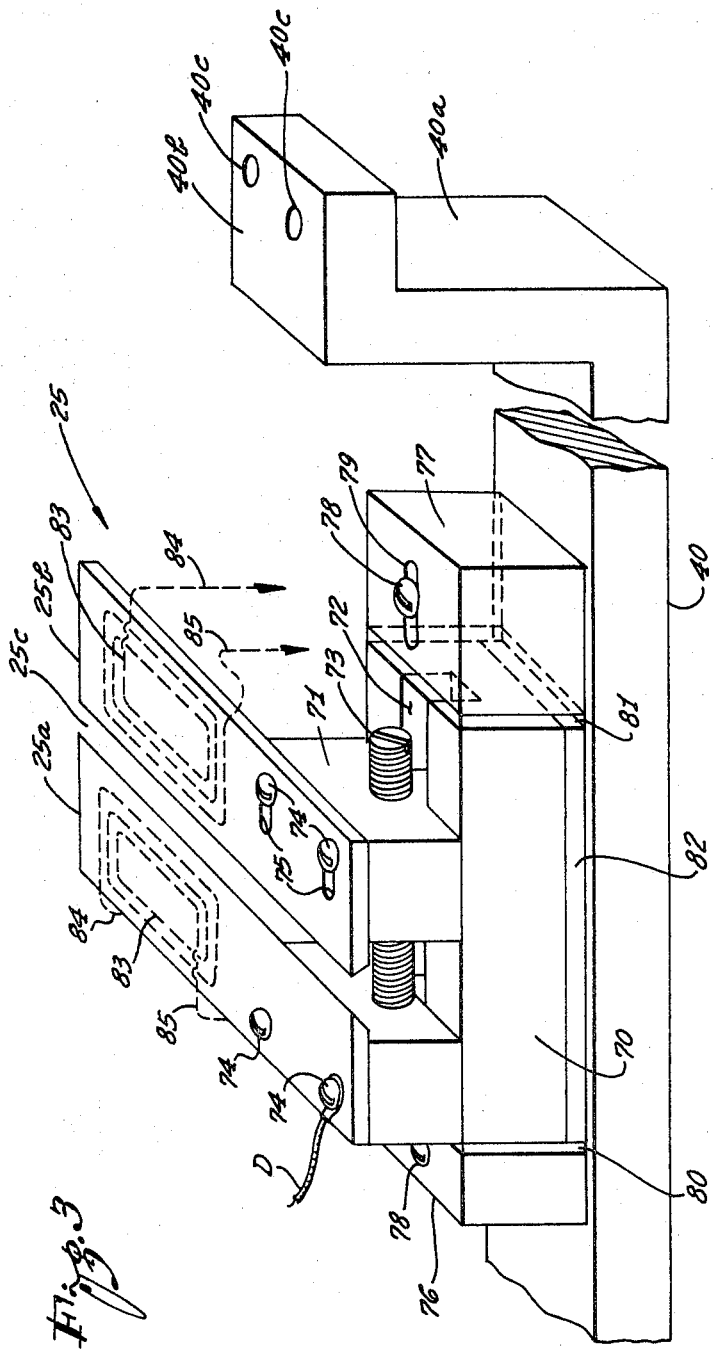

United States Patent Office 3,436,510
Patented Apr. 1, 1969

3,436,510
ELECTRON BEAM MACHINING APPARATUS FOR PRODUCING HIGH DEFINITION ENCODERS
Norman F. Fyler, Menlo Park, Calif., assignor to Litton Precision Products, Inc., San Carlos, Calif., a corporation of Delaware
Filed June 14, 1967, Ser. No. 646,425
Int. Cl. B23k 9/00
U.S. Cl. 219—69        8 Claims

ABSTRACT OF THE DISCLOSURE

Fiducial marks of microscopic width are machined by an electron beam upon the surface of a disk carried upon a table. The electron beam is directed at an aperture mounted adjacent a disk through which a portion of the electron beam passes to machine the fiducial mark. Control means including a shaft encoder are utilized to rotate the table and successively operate the beam to produce a plurality of fiducial marks upon the disk surface.

---

Figure 1:
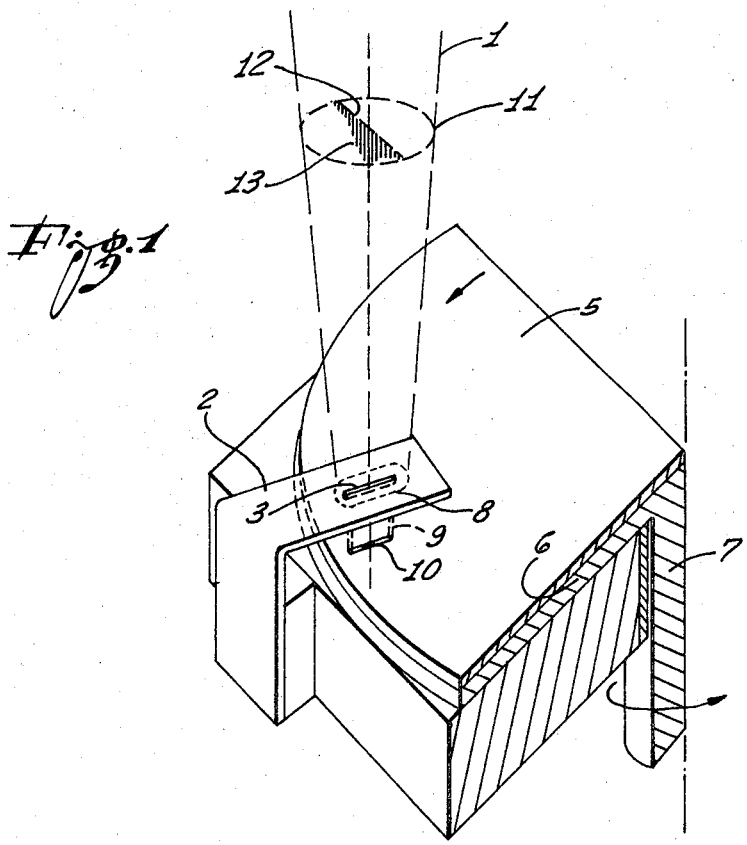

This invention relates to the creation of fiducial marks upon a surface, and more specifically, to an apparatus for recording lines of microscopically small width upon a surface without blurring, utilizing an electron beam and a slit aperture.

In many position determining systems, fiducial marks situated upon a movable surface are utilized to resolve the mechanical position of the movable surface into an electrical signal. A count of the number of such fiducial marks passing a reference point or a sensing of the presence or absence of a series of marks may be presented in digital form to indicate the amount of change in the position of the movable surface carrying the aforesaid marks. A typical system is an encoder disk driven by a rotatable shaft. The fiducial marks generally divide the encoder disk into sectors and patterns. An optical or brush system detects the presence or absence of the mark or of the series of marks, and electronic counting or decoding means detects the number of marks and converts the count or code into a signal indicative of the angular position of the shaft.

As is apparent, high definition and high resolution of position to the best possible degree is today a necessity. For instance, in the field of interstellar navigation, small errors of no more than fractions of a minute of a degree in measurement of the angular position of a body distant millions of miles may amount to an absolute error of many miles. Axiomatically, the greater the number of such fiducial marks that can be stored on a given length of surface, then the greater is the accuracy in resolution or definition, or alternatively, the smaller the size an encoder disk need be for the same accuracy. The limiting factor in the accuracy of present high resolution encoder disks is the number of fiducial marks which can be made on any given length of surface.

However, the resolution capability of such encoder disks describes only the maximum number of elements per unit length discernible. Therefore, the limiting resolution parameter, by itself, is not sufficient to convey image quality. The contrast ratio of the optical image or the sharpness of the edge of the mark is also important. It is a fundamental principle that for any given image, optical or otherwise, any supplementary operation or transform such as reproduction process, tends to reduce the sharpness of the image as transformed or reproduced. Thus, practically speaking, the quality of the basic image to be used as a pattern or master for an encoder disk must be considerably greater than the quality of performance desired from the encoder system using a copy of the basic image as an encoder disk.

The current widely accepted techniques for producing the precision patterns and marks needed for high definition encoder disk patterns are photography and photoetching. There are, however, many parameters which tend to limit the upper levels of resolution which can be achieved with these techniques. One parameter which is an absolute limit is the wavelength of the light source used in the photographic or photoetching process. In order to use the available processes up to this absolute limitation, it is necessary to use light with the shortest wavelength possible for photography, consistent with high performance of other components in the system. With blue or near ultraviolet light, the absolute resolution limit appears to be approximately 150,000 lines per linear inch. This absolute wavelength limit of resolution permits the achievement of a desirable 100,000 lines per inch. However, limitations imposed by other portions of the optical system are of a much more restrictive nature. For example, practical lens systems are severely limited in their resolution capability to substantially less than the basic wavelength resolution capability. The best lenses presently available achieve approximately 2,500 lines per inch in a 2 inch by 2 inch field. Therefore, in order to avoid the limitation imposed by the lens, the best photographic results are achieved when contact reproduction methods are used.

Another important practical limitation in optical and photographic techniques is the fineness of grain structure of photographic film. The finer the grain structure, the greater the resolution that is obtainable. Special high resolution photographic emulsions are capable of recording lines of microscopic width, but are not considered capable of recording line pairs of acceptable quality in the submicron range.

Thus, present techniques in the encoder art encounter as a basic limitation the wavelength of the light used, and additional limitations are imposed by the optical and photographic state of the art. These latter limitations restrict those production techniques to about 1,000–10,000 lines per linear inch with fields the size of encoder disks. Since it is desirable to achieve the capability of producing 100,000 or more lines per inch, the prior art techniques are obviously unsatisfactory.

It is known that a high intensity electron beam can produce lines or marks of high sharpness and of large resolution. The resolving power of an electron beam is inherently much greater than that of ordinary light as is dramatically displayed by the much greater magnification and resolution available with the electron microscope as compared to that available with the ordinary optical microscope. Basically, this is because the effective wavelength of the electron is much less than the wavelength of the ordinary optical light. The effective wavelength of practical electron beams is from 1–10 angstrom units (25–250 billionths of an inch) instead of the 4,000–10,000 angstrom units effective wavelength of practical light. Thus, comparing the theoretical values of dimensional resolution capability with electron beams, an improvement in intrinsic or ultimate resolution capability of approximately 1,000 fold is realized.

In addition to the advantage of extremely short wavelength and very high resolution, the electron beam offers the advantage of extremely high energy capability. As the electron velocity approaches the speed of light, i.e., with accelerating potentials exceeding 100,000 volts, the electron beam is capable of "machining" or vaporizing, in a very local area, almost any material known to man.

Moreover, the electron beam is capable of being turned on and off, and varied in intensity to any degree with very high speed and by relatively simple electronic equipment. Furthermore, the electron beam is capable of being deflected from point to point with virtually no lag and virtually no back-lash in properly constructed and shielded systems. Thus, the electron beam selectively removes material in a precise manner in submicroscopic patterns. Moreover, the electron beam may be used with or without photographic materials to produce the high definition patterns needed for precision encoder disks. With the high resolution capability of an electron beam, the actual resolution limitation is imposed by the grain of either evaporated metal coatings or the film emulsion upon a substrate material. This appears to be on the order of 1 million lines per inch for the former and less for the latter coating.

When dealing with such sensitive electron beam equipment and infinitesimal dimensions, it has been found that electrical, magnetic and physical tremor and vibration occurring in buildings due to machinery, variations in electrical power, supplies, and other causes are of a magnitude sufficient to cause movement of the electron source or electron beam relative to the disk being machined, and that the basic nature of a beam of electrons possess an undesirable characteristic resulting in lines of poor contrast or sharpness and uneven spacing. This precludes the use, solely, of an electron beam for machining. Moreover, these same difficulties rendered ordinary electron beam machining equipment unacceptable for use in producing a series of high resolution spaced fiducial marks.

Therefore it is an object of the present invention to provide the means and a method for producing an encoder disk having fiducial marks of microscopic width.

It is a further object of the invention to provide electron beam means to produce a series of microscopically thin fiducial lines without blurring upon either a photographic or metallic base.

It is a further object of the invention to provide electron beam means to produce a series of uniformly spaced lines of a width less than one-one hundred thousandths of an inch upon a surface.

It is a further object of the invention to produce with an electron beam an encoder disk having a series of microscopically evenly spaced and microscopically thin fiducial marks of good contrast.

In accordance with the invention, an electron gun is provided and aimed at the encoder disk surface. A mask containing a slit aperture is located between the gun and an encoder disk surface. The mask is attached to a base, which also supports the encoder disk surface and is located as close as possible to the encoder disk surface. In operation the electron gun produces an electron beam of desired dimensions which is directed to the slit aperture. A portion of the beam passes through the slit aperture to the encoder disk surface to be machined and machines a fiducial mark upon the encoder disk surface.

Further in accordance with the invention, the encoder disk surface is carried by a rotatable table itself carried upon the base. The rotatable table moves the disk surface beneath the mask exposing a plurality of angular positions to the slit opening, and an electron beam control means controls the energization of the electron gun at each location so as to machine a plurality of spaced fiducial marks upon the disk surface. Additionally, the rotatable table is rotated through a motion divider driven with a motor. A shaft position encoder is coupled to the input of the motion divider and forms a part of the electron beam control means.

Figure 4:
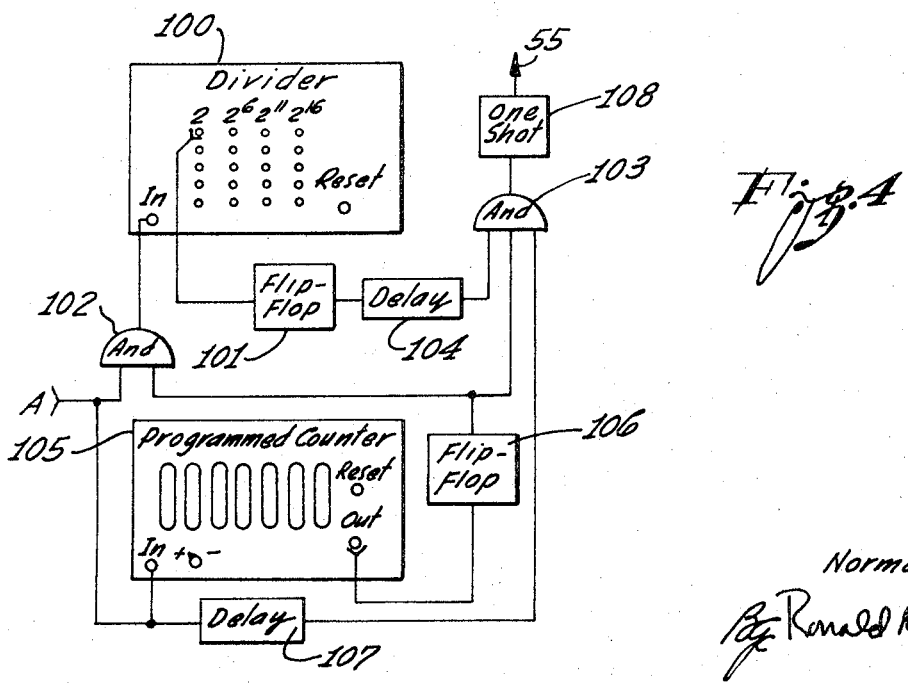

The foregoing and other objects and advantages of the invention becomes apparent from a reading of the following detailed description and with reference to the drawings in which:

FIGURE 1 illustrates some general principles and organization of electron beam machining embodied within the present invention;

FIGURE 2 illustrates, partially in section with the near wall removed, a practical apparatus for machining a plurality of spaced lines in a track about an encoder disk surface which embodies the invention; and, FIGURE 3 illustrates in greater detail the slit aperture utilized in the embodiment of FIGURE 2; and, FIGURE 4 illustrates a form of control circuit used with the embodiment of FIGURE 2 for selectively machining groups of lines.

FIGURE 1, illustrative of the principles embodied in the invention, shows an electron beam 1, indicated by dashed lines, which is generated by a suitable electron gun, not illustrated, within a vacuum chamber. The beam is directed at a mask or slit aperture means 2 containing a slit aperture 3. The mask 2 is fixedly mounted to a bed or stationary table 4 and is interposed between the electron gun and an encoder disk surface 5, partially illustrated in FIGURE 1. Encoder disk surface 5 is carried by a table 6, partially illustrated, which is rotated by a shaft 7. Preferably, the table 6 is supported by the stationary table 4 so that any vibratory movement transmitted from stationary table 4 to rotatable table 6 is also transmitted to mask 2. Preferably, mask 2 is mounted so that slit aperture 3 is located as close as is practicable to disk surface 5.

A portion of the electron beam impinges upon slit aperture means 2, as indicated by the dashed lines of outline 8, and another portion indicated by dashed lines 9, passes through the slit aperture 3 to "machine" a fiducial mark, shown as a straight line 10 in FIGURE 1, upon the surface of disk 5.

As herein used, the term "machining" means to change the physical characteristics of the material being machined relative to the material remaining. Thus, in an application of the electron beam to a relatively thick metal disk, as the worked material, the term machining includes the erosion or rooting out of material from the desired space. In an application where a thin metallic film deposited upon a quartz glass is the work, the term machining includes the oxidizing of the metal of the machined portion, which is transparent relative to the remainder of the metallic film surface. And, in an application where a high resolution fine grain film emulsion is coated upon quartz glass as the work, the term machining means to cause the chemical reaction, commonly referred to as "exposing" the film.

Shaft 7 rotates the rotatable table 6 to other positions at which different portions of disk surface 5 are positioned under slit aperture 3. Repositioning of disk surface 5 and energization of the electron gun thus machines a spaced plurality of fiducial marks about the surface of disk surface 5.

Advantageously, through the use of well known electron optics and focusing techniques, the electron beam 1 is formed having a cross section conforming to and slightly larger than that of slit aperture 3. In this figure, this is indicated by outline 8 of the electron beam incident upon mask 2. The dimensions of slit aperture 3 are preferably slightly smaller than the dimensions of the fiducial mark to be machined.

The significance of the invention embodied in FIGURE 1 is more apparent when it is considered that fiducial marks such as lines having widths of less than two-millionths of an inch are machined onto a disk surface and are machined in a spaced series of such marks, spaced from each other by distances of about two-millionths of an inch. These fiducial marks even at these dimensions must be clearly distinguishable from the remaining surface portions of the encoder disk surface and each mark must possess a maximum contrast across the entire width to define sharp edges. Blurred edges on a mark make it difficult for the equipment with which the encoder disk is to be used to distinguish a change in position or determine precisely where the change of position occurs. Such a series of equally spaced fiducial marks must be precisely uniformly spaced if the encoder equipment utilizing the disk is to possess the desired accuracy.

Focusing an electron beam to produce marks of microscopic dimensions without a mask 2 is extremely difficult, and as a practical matter, insurmountable. Also, because electrons in the beam do not have a uniform energy, it becomes difficult to machine marks of uniformly maximum contrast. In the illustration of FIGURE 1, the intersection of a plane perpendicular to the electron beam axis with the electron beam illustrates a locus or outline 11. A plane parallel to the axis in a direction transverse to the width of the slit aperture 3 intersects the aforesaid plane in a line 12. Along this line, the energy profile of the electron beam is approximated graphically, and illustrated as 13. As illustrated, the energy profile 13 of electron beam 1 is not uniform but is seen to be approximated by a gaussian distribution; that is, an electron in the center of the beam has greater intensity than an electron at its edges. Without the aperture 3, a mark produced solely by the electron beam is more deeply machined or possesses a sharper contrast at its center and is of lesser contrast at its edges due to the lower energy. This produces a blurred mark. An aperture of smaller width than the beam admits only the highest range of beam intensities, about the crest of the energy distribution within a given profile, to produce a mark that possesses sharp contrast even at its edges.

Relative movement between the disk surface 5 and electron beam 1 can be caused by deflection of the electron beam created by a minute transient in the electron beam focusing structure or by movement of table 6 relative to the electron gun caused by ambient vibration such as caused by machinery located near the apparatus. If no mask 2 with aperture 3 were used, the machined mark would be shifted in position relative to other previously machined marks, depending upon the magnitude of such relative movement at the time the electron beam were to be energized. Moreover where the beam is energized during an entire period of this relative movement, a very wide and blurred fiducial mark would be produced. Additionally, if the magnitude of such relative displacement is on the order of the spacing desired between fiducial marks, then no acceptable fiducial marks could be produced since the marks would then overlap.

As illustrated, the mask 2 is mounted to move with disk surface 5 to a greater degree than the electron gun producing the electron beam. Hence, any relative movement between the electron beam 1 and disk surface 5 during machining does not result in a change in position or blurring of the fiducial mark. The position of the slit aperture 3 remains stationary relative to the disk surface 5, and since only that portion of beam 1 which falls within slit aperture 3 is incident upon disk surface 5, no blurring defects occur.

A second consideration involved in the mounting of the mask 2 as close as is possible to disk surface 5 is to limit electron dispersion. The slit aperture 3 acts as an electron lens. Accordingly, that portion of electron beam 1 progressing through the aperture will tend to diverge rather than travel in a straight line. Thus, by having the surface 5 be machined as close as possible to the slit aperture, the electron beam is incident upon the surface 5 before it diverges in any significant amount. Preferably the distance from the mask to the disk surface is made as small as the width of the aperture, if that is possible. For the ultimate results this distance approximates the "De Broglie" wavelength, $\lambda d$, where $$\lambda d \sqrt{\frac{V}{150}} \text{ angstrom units}$$

and V equals the accelerating potential in volts. Further compensation for this divergence may be had by making the size of the slit aperture 3 smaller in dimension than the desired fiducial mark 10. Additionally the mask is of material having a low secondary emission.

As earlier mentioned, the encoder disk surface which is machined in accordance with the invention can be of any desired electron beam "machineable" material. As examples, one disk surface consists of a high resolution photographic emulsion coated on a quartz glass support; another consists of a thin layer of pure metal deposited upon a quartz glass surface; and another a thick metal disk. Practically any material may be machined by the electron beam. Adjustment of the acceleration potential and beam exposure duration is desirable depending upon the composition of the encoder disk surface so that only the desired degree of machining occurs.

With the photographic emulsion or film, the amount of bombardment necessary to fully expose the desired portions is determined by experimentation. Likewise, the amount necessary to oxidize portions of the metallic film, thereby making a transparent metal oxide in the exposed portion is determined experimentally. With a thick disk, that accelerating potential and beam exposure necessary to fully erode the metal is also determined by experiment. However, such are obvious adjustments and need not be further discussed.

A practical embodiment of the invention that incorporates the principles discussed with respect to FIGURE 1 is shown in FIGURE 2.

FIGURE 2 schematically shows an embodiment of the invention for electron machining at least one track of an encoder disk surface. This includes a vacuum chamber 21 having walls constructed of steel and a steel door 22 to provide access to the chamber. An electron gun 23 is vertically supported by the top wall of the chamber for directing an electron beam into chamber 21. Located within chamber 21 is a support for physically supporting both the mask 25 containing the slit aperture and the rotatable encoder disk surface 26 to be machined. Support 24 includes a bottom table 27, four upright ribs 28, only two of which are visible in the figure; and four horizontal ribs 29, only one of which is fully shown, joined between the two visible upright ribs 28, connected between each of the upright ribs 28 to form a supporting cage structure upon table 27.

A second table 30 is supported by table 27. Table 30 carries a motion divider 31, which supports a rotatable table 32 on an output shaft 33. Disk surface 26 is supported on table 32. Additionally, table 30 supports an electrical motor 34 and a shaft position encoder 35. Each of the tables 27 and 30 includes bearings 36 to allow the support structure 24 to be moved partially out of the chamber 21 through the door opening and to allow table 30 to be moved within support 24. The position of table 30 relative to table 27 is manually adjustable with a micrometer adjusting screw 37 mounted to the door of the chamber by a sleeve 38. Screw 37 may be alternatively mounted on a chamber wall.

The mask 25 is mounted upon a support 40. Details of the structure of mask 25 are shown in FIGURE 3, discussed below. A support 40 is mounted between two upper horizontal ribs 29 to interpose the slit aperture between the mouth or mask 41 of electron gun 23 and the rotatable support 32 and disk surface 26.

A stop 42 is provided within chamber 21 to limit the movement of support structure 24, which is to be fixed in place during the machining process. A wedge 43 is also included to prevent movement of support 24 during micrometer adjustment of the position of table 30 relative to table 27 of support 24. A vacuum pump, not illustrated is connected to vacuum chamber 21 through an exhaust passage 44.

The electric motor 34 has a shaft 46 that is connected to the input shaft 47 of motion divider 31. A gear 48 is coupled to shaft 47 and drives a second gear 49 attached to the input shaft 50 of the shaft position encoder 35. The cut away portion of the shaft position encoder 35 illustrates its conventional contents; a disk 51 which is promoted to rotate with shaft 50, and at least one read out means or pick up 52 which detects, for instance, light passing through apertures in disk 51 as the disk rotates.

Electrical connections to the elements within chamber 21 are made with an electrical connector 45 extending through a wall of chamber 21. Additional connectors may be provided. As many terminals as is desired may be provided on this electrical connector.

Electrical connections to motors 34 are shown as B and C. These connections are connected to like terminals B and C of electrical connector 45 through electrical wire, not illustrated, having sufficient slack so that the connection is not broken upon the partial withdrawal of support 24 through the door opening. Similarly, from the connector 45, these leads are connected to a motor control circuit 67 containing the conventional power supplies and switches for energizing the motor 34. Support 24 is electrically grounded through terminal F of connector 45. The mask 25, which is insulated from the support 24 in a manner more clearly shown in FIGURE 3, is connected by an electrical lead D to terminal D of electrical connector 45. Terminal D of connector 45 is connected to ground through an ammeter 53. The output of pick up 52 is connected by lead A to terminal A of connector 45, which terminal is in turn connected to an electric counter 54 and an input 55 of intensity control circuit 56. Terminal E of electric connector 45 is connected to ground through an ammeter 57 and is used only during adjustment of the apparatus, in a manner hereinafter described. Chamber 21 is electrically grounded at any convenient location, such as is shown at 58 to prevent any possible hazardous voltage from appearing on the walls of chamber 21.

The electron beam generator 23 is an ordinary electron gun which may be of the type found in an electron microscope. The conventional construction of an electron gun includes a filament 59 connected to a filament power supply 62 for heating a cathode 60, which when heated emits electrons in the customary manner. An accelerating potential, supplied by a conventional high voltage supply 61, is applied between cathode 60 and ground. The negative polarity of supply 61 is connected to cathode 60 and the positive polarity to ground, placing the grounded mask 25, support 24, and the walls of chamber 21 at a high positive potential relative to the cathode 60.

Electron gun 23 also contains a conventional control grid 63 for turning the electron beam on and off. This control grid is connected to intensity control circuit 56. Intensity control circuit 56 includes any conventional type of electronic switch controlled by an input signal. A focusing coil 65 surrounds the neck of the electron gun 23 to create in response to current therethrough a magnetic field having the same direction as electron beam 64. This magnetic or "focusing" field converges the rapidly moving electrons emitted by cathode 60 into a narrow beam 64. Coil 65 is connected to a focus control circuit 66. The mouth or mask 41 of the electron gun has an opening which limits the cross section of beam 64.

It is noted that the walls of vacuum chamber 21 and the electron gun 23 are constructed of conductive material, such as steel, both for rigidity and in order to prevent stray electric or magnetic fields from causing errors in the electron beam machining process.

FIGURE 3 shows, in greater detail, the construction and mounting of a form of the mask 25 utilized in the machine of FIGURE 2. The slit aperture 25C is formed between two spaced precision ground blades 25a and 25b. Desirably, aperture 25c is less than 2 microns in width. Such dimension is exaggerated in FIGURE 2 for purposes of illustration. In the particular application of FIGURE 2, the slit aperture 25c is to form straight lines on the encoder disk surface 26. Hence, the edges of blades 25a and 25b are parallel and straight as shown. Moreover, the width of each blade is greater than the width of the electron beam in order that any portions of the electron beam other than the portion falling within the aperture are intercepted and prevented from reaching the encoder disk surface. As previously discussed, a beam width larger than slit aperture 25c is maintained in order to ensure that a portion of the beam falls within slit aperture 25c in the presence of relative movement occurring between the beam and mask 25.

Blades 25a and 25b are mounted to a supporting block and traveler shown as a first blade support member or block 70, and a second blade support member or traveler 71 mounted in a groove 72 in first support member 70 and connected therewith by micrometer adjustment screw 73. Each blade is affixed to one of the supports, for example by a pair of screws 74 extending through holes 75. The holes 75 may be slotted as illustrated to allow rough adjustment of the blade spacing. The micrometer adjustment screw 73 positions the traveler 71 to various positions within groove 72 relative to the first blade support member 70 to adjust the width of slit aperture 25c.

The output terminal A of shaft position encoder 35 is connected to the input of intensity control circuit 56 for providing a path for trigger pulses generated by the position encoder to trigger the intensity control circuit 56. Upon each initiation, intensity control circuit 56 permits the generation of electron beam 64 for a very short time. In the embodiment of FIGURE 2, for example, the motion divider 31 is a conventional precision made mechanical gearing arrangement by means of which each revolution of the input shaft 47 results in only one-five hundred and twelfth of a revolution of the output shaft 33. The shaft position encoder 35, coupled to the motion divider, produces at its output A, 512 pulses for each revolution of input shaft 47. Thus, 262,144 pulses are produced by shaft position encoder 35 in each complete rotation of rotatable table 32. Intensity control circuit 56 is thus triggered 262,144 distinct times during each revolution of rotatable table 26, and the electron beam 64 is turned on and off the same number of times.

An electrical counter 54 is provided which conventionally contains a manually operated reset switch 68 to reset the counter to zero as desired. A source of trigger voltage 69 is connected in the intensity control circuit 56 through a manually operated switch 70. Closure of switch 70 effects continuous operation of intensity control circuit 56 to allow generation of electron beam 64 throughout the period of switch closure so that adjustments are permitted in a manner hereinafter described.

Referring again to FIGURE 2, it is seen that the slit aperture means 25 is mechanically mounted by a bracket 40, only one arm of which is illustrated, between the horizontal support ribs 29 of support 24 in order to interpose the slit aperture means between the disk surface 26, hence, rotatable table 26, and the mouth or passage 41 of electron gun 23. Desirably, blades 25a and 25b are mounted as close to the disk surface 26 as mechanical considerations permit.

FIGURE 3 additionally shows the details of a bracket for mounting mask 25 between the ribs 29. The bracket 40 includes an inverted L-shaped arm at each end. This arm includes an upright portion 40a and a horizontal portion 40b at each end. An additional arm located at the other end of bracket 40, not illustrated, is obviously the reverse of the illustrated arm. This bracket fits between the horizontal ribs 29 of support 24 and is fastened thereto, for example by bolts extending through holes 40c. Clamping blocks 76 and 77 are provided and are affixed to bracket 40 by bolts 78, which extend through slotted holes 79 to tapped holes, not illustrated, in bracket 40. These clamping blocks affix blade support member 70, and hence, mask 25 to support 40. Between each clamping block and block 70 a layer of electrical insulating material 80 and 81 for preventing electrical contact between the blades 25a and 25b and bracket 40. The bottom of block or blade support member 70 is electrically insulated from bracket 40 by an insulating layer 82. An electrical lead D is connected to the mask 25 at 25a to provide a path for current created by electrons falling upon the blades in a manner hereinafter more fully described.

The edge contour of each of blades 25a and 25b forming the slit aperture 25c is shown formed at an angle to the plane of the upper surface of each blade. This is provided, as desired, for the purpose of minimizing the generation of X-rays, which is of significance when the encoder disk to be machined is film or photographic emulsion. However, it is apparent that other edge contours forming aperture 25c are readily apparent and can be substituted.

Additionally, blades 25a and 25b are constructed of material preferably having a low atomic number, low secondary emission, and of high thermal stability. Readily apparent examples are carbon and stainless steel. Such specifications minimize the creation of X-rays and prevent or inhibit changes in the dimensions of the aperture 31 through heating such as that created by kinetic energy released from colliding electrons.

In order to form a straight edge on each of the blades 25a and 25b that appears smooth and straight even at dimensions of 1 to 2 millionths of an inch special procedures are used, such as a lapping process. One preferred example of the lapping process is as follows: At least three blades are held together, even though only two blades will be ultimately utilized as a part of the apparatus, and their edges are rubbed on a surface containing abrasives. The blade edges are polished by the abrasives to a first degree of smoothness. A finer abrasive is substituted and lapping continued to a further degree of smoothness. This procedure is repeated and in the final lapping process the finest diamond powders are used as abrasives and the blade edges are finished to the required degree of smoothness; of course other available procedures may be used.

In order to obtain a microscopic fiducial mark of the best possible sharp contrast with the disclosed apparatus, the electron beam is focused slightly in front of the slit aperture means. To accomplish the preferable adjustment of focus, certain measurements are made: One, a measurement of the electrons bombarding the blade surface; and two, a measurement of the electrons proceeding through aperture 25c to the disk surface. In order to provide electrical isolation for these measurements, the blade supporting members 70 and 71 are insulated from support 40 by the thin layer of insulating material 82 between the bracket and member 32, and from the clamping members 76 and 77 by insulating layers 80 and 81. The electrical lead D attached to blade 25a is connected with an ammeter 53 located outside chamber 21 through terminal D of connector 45 as shown in FIGURE 2. Each of the blades are grounded directly or through the meter 53 so as to be placed at a high positive potential relative to the cathode of electron gun 23.

It may additionally be desired that blades 25a and 25c be heated above ambient temperatures, either from bombardment with a second electron beam, provided within chamber 21 for such purpose, or with a heating coil placed in contact with the blade surface. In the slit aperture embodiment of FIGURE 3, such may be provided by heating coil 83 indicated by dashed lines in FIGURE 3, placed in contact with the blade surfaces and connected by means of like leads 84 and 85 in parallel to a source of heating current, not illustrated, through spare terminals, such as F and G of electrical connector 45 illustrated in FIGURE 2. These flat heating coils may be covered by a flat surface, not illustrated, to sandwich it between this surface and the blade. Alternatively, depending upon the composition of the blade material, coil 83 may be bonded directly to the blade with any high temperature stable heat conducting material. At microscopic dimensions of less than 2 microns, the additional heating of blades 25a and 25b is desirable for two reasons: First, in any evacuated space, as a practical matter, some impurities or dirt remains, which travels by means of kinetic energy through the evacuated space and settles upon the coolest available location. With the blades heated to higher temperatures than other elements in the accumulation of dirt which could possibly block aperture 31 is inhibited and may be burned off to reduce blade cleaning problems. Secondly, depending upon the thermal stability of the blade material, at aperture dimensions of less than a micron, expansion of the blades can close the slit aperture. By regulating the temperature of the blades it is in fact possible to control the width of such a microscopic aperture by means of the thermal coefficient of expansion property of the blade material. This provision does not appear as desirable with disk surfaces that are affected by heat.

It is noted that whatever blade heating that may result from electron beam bombardment is substantially mitigated by the presence of the relatively large supporting structure 24, which acts somewhat as a heat sink. Moreover, it is apparent that the function performed by blade supports 70 and 71 and bracket 40 can be obtained with supports differing in detail from that illustrated in FIGURE 3. Additionally, it is noted that the insulating layers 80, 81, and 82, and leads, such as D, are necessary only insofar as it is desired to make current measurements.

Although slit aperture 25c is shown formed by two precision ground blades adjustably separated by the required distance, it is apparent that apertures of the desired dimensions may be formed by other means than presented in FIGURE 3. If the adjustment of the aperture dimensions is not desired, an aperture of the required height and width can be directly perforated in one piece material, such as was illustrated in FIGURE 1. Sub-microscopic dimensions may be obtained in a single piece of material by a period of bombardment of such material with electrons of very high energy in the desired aperture pattern.

In general, slit aperture 25c is desirably smaller in width than the width of the fiducial mark desired. This is necessary in order to account for the dispersion of the electron beam falling within the aperture 25c. Moreover, the aperture desirably admits only that portion of the electron beam profile which has the highest energy level as discussed in FIGURE 1.

The apparatus is preferably prepared for operation in the following manner: The chamber door 22 is removed and support 24 is partially withdrawn from chamber 21 through the door opening. Table 30 is partially withdrawn from its normal position so as to remove rotatable table 32 from its position beneath slit aperture means 25. This movement of table 30 and support 24 is limited by the slack in the electrical cables, which may be disconnected if a larger withdrawal is desired.

A conductive disk, not illustrated, but having an insulating backing and substantially dimensionally similar to encoder disk surface 26 is placed upon rotatable table 32. Table 30 is then returned to its normal position within table 27 of support 24 to place a portion of the conductive disk beneath the slit aperture of slit aperture means 25 upon return of support 24.

Support 24 including the table 27 is returned to its normal position abutting the stop 42 within chamber 21 for positioning slit aperture means 25 and the conductive disk beneath the mouth of the electron gun 23. An electrical lead is affixed to the conductive disk and is connected to terminal E of connector 45. The door 22 is fixed in place to close chamber 21. The vacuum pump, connected to chamber 21 by means of exhaust pipe 44, is turned on and commences to evacuate chamber 21 of air and other gases. Because of small leaks in chamber 22, the pump is as a practical matter continuously operated during the entire procedure. The filament voltage 62 is turned on to supply current to filament 59, and the high voltage supply 61 is turned on to place a high accelerating voltage between cathode 60 and the elements, including support 24 and slit aperture means 25, within chamber 21.

However, until a start signal appears at the input of intensity control circuit 56, the intensity control circuit normally maintains a blocking bias upon electron gun grid 63, which prevents substantial emission of electrons through mouth 41. Terminal E of connector 45 is connected to ground through ammeter 57. The intensity control circuit 56 is then supplied with a continuous start signal through means of a manally operated switch 70 connected to a source 69. Thereupon intensity control circuit 56 removes the blocking potential from grid 63 and an electron beam 64 is generated. Focus control circuit 66 is operated and supplies current to focus coil 65. Current through focus coil 65 creates an axial magnetic field which condenses the electrons accelerated from cathode 60 into the form of beam 64. By adjustment of the focus control circuit, the point of beam convergence or focus is varied. Likewise, the beam cross sectional shape changes.

Electrons impinging upon the blades 25a and 25b form a current which is measured upon meter 53. Electrons traveling through slit aperture 25c impinge upon a conductive portion of the inserted conductive disk beneath aperture 25c and creates a measurable current. By adjusting focus control circuit 66 current through meter 57 is measured, representative of the fact that electron beam 64 is focused at a location within slit aperture 25c. Meter 53 measures the total current falling on blades 25a and 25b and is representative of the beam width. Advantageously, upon obtaining optimum current condition, the focus control may be backed off or defocused to a slight degree, so as to focus electron beam 64 slightly in front of the slit aperture means 25. In this manner, there is less dispersion of the portion of electron beam 64 falling within slit aperture 25c, by slit aperture 25c, and although a lesser number of electrons reach the conductive portion of the disk surface, the portion progressing through aperture 25c conforms more nearly to the dimensions of the aperture with dispersion. A wider machined line would otherwise be obtained.

It is recognized that if a line wider than slit aperture 25c and of lesser contrast at its edges is acceptable, then no particular focusing adjustment is necessary other than to maximize the electron beam current focused within slit aperture 25c. Accordingly, the dispersion of electron beam 64 within slit aperture 25c inherently results in a wider fiducial mark of lesser contrast at its edges.

Subsequent to the foregoing adjustments, switch 70 is opened to remove the start signal from the intensity control circuit 56 and a blocking bias is thereby placed upon electron gun grid 63 in order to extinguish the electron beam 64.

The pumps are halted, air is let into chamber 21, door 3 is opened, the electrical lead between the conductive disk and the terminal E are removed, and the conductive disk is withdrawn.

It is also recognized that conductive probes other than the conductive disk suggested could be placed beneath slit aperture means 25 to measure the amount of beam current progressing therethrough. However, the disk possesses the advantage of being closely spaced to the aperture blades 25a and 25b, rotatable table 32; and more accurately approximates the conditions of disk surface 26, without introducing additional complexities to the apparatus.

Since the desired focusing of the electron beam is an accomplished fact at this step in the machining process, the apparatus is ready to automatically machine the required number of lines desired about one track on the surface of a disk surface 26, as illustrated in FIGURE 2. The encoder disk surface 26, which may consist, as an example, of the photographic emulsion or film coated upon a stable glass surface, is inserted into place upon rotatable table 32. Hence, table 30 and support 24 carrying rotatable table 32 are returned to a normal position within chamber 21.

Micrometer positioning member 37 is adjusted to move table 30 within table 27 relative to support 24 fixed between stop 42 and wedge 43 to a desired position by means of axially positionable projecting rod 39. This positions the electron beam 64 at a given radial distance from the axis of rotation (shaft 10) of disk surface 26 to define a circular "track" on the disk surface at the desired radius.

The chamber door 22 is closed; the vacuum pump again operated to evacuate chamber 21; the filament voltage supply 62; high voltage supply 61; and focus control circuit 66 are operated; the intensity control circuit 56, motor control circuit 67, and the shaft encoder 35 are prepared; and electronic counter 54 set to zero by operation of its reset switch 68.

The motor control circuit 67 is operated and energizes motor 34 which commences the rotation of its shaft 46. Shaft 46 rotates shaft 47, the input of motion divider 31.

As previously described, motion divider 31 by means of known mechanical gearing arrangements, rotates its output shaft 33 and rotatable table 32 supported thereby through only one-five hundred and twelfth of a revolution for each revolution of its input shaft 47. Shaft position encoder 35 is conveniently coupled to receive the motion of input shaft 47 through gears 48 and 49 connected to its input shaft 50, and conveniently provides 512 output pulses from pick up 52 during each rotation of input shaft 47. Thus, 512×512 or 262, 144 different pulses are generated and define a like number of angular positions about the track upon the surface of disk 26.

Each position mark appearing on the shaft encoder disk 51 is detected by the pick up 52. In response to the detection of a mark, pick up 52 provides a pulse at its output. This pulse is fed both to the intensity control circuit 56 to act as a start or triggering signal and to electronic counter 54. In response to each triggering signal at its input, intensity control circuit 56 removes the blocking potential from grid 63 of electron gun 23 for a determined period of time. During each period that the blocking potential is removed from grid 63, the electron beam 64 is generated and a portion of this beam proceeds through the slit aperture 25c of the slit aperture means 25 to the surface of the disk 26. As is known, the energy contained in the electron beam is capable of machining the surface of disk 26, and where disk 26 consists of a film emulsion, the electron beam releases sufficient energy to precipitate the metal found in the emulsion. In addition, the counter 54 is stepped to indicate the machining of the mark.

The process continues automatically until an entire track consisting of a spaced series of marks is machined. This is indicated to the operator by the count of the shaft encoder output pulses indicated upon electronic counter 54.

By utilizing a controlling predetermined counter, the intensity control circuit may be automatically inhibited at the completion of a desired count to prevent remachining over previously machined lines, while driving motor 34 is shut off and allowed to stop. With the most conventional electronic counter, however, it is apparent that as the predetermined count is approached the operator must turn off motor 34 through control circuit 67 and then open the input to the intensity control circuit 56 to prevent further machining. However, in this instance, some lines will be remachined.

Since the mask 25 is mounted to the support 24 and table 32 is carried by support 24, any vibrations thereof relative to electron beam 64 either mechanical or electrical generally are operative upon both the support 24 and slit aperture means 25. Thus, the angular position of a fiducial mark upon disg surface 26 relative to the slit aperture in mask 25 appears to remain stationary. In other words, any mechanical vibrations of the electron gun 2 or electrical movement of the electron beam 64 relative to slit aperture and disk surface 26 effectively appears to be no more than the displacement of the electron beam 64 relative to a positionally fixed slit aperture 25c and encoder disk surface 26. Thus, although different portions of the cross section of electron beam 64 may be utilized to machine surface 26, the relative width of the line desired remains substantially constant and of the desired sharp contrast. Absent slit aperture 25c, any relative vibration between the electron beam 64 and support 24 may cause the machined fiducial mark to be wider than desired, blurred at its edges, and inaccurately positioned relative to other marks in the sequence, since beam 64 would be free to vibrate or be displaced to different positions relative to the disk surface 26 during the course of any such relative displacement.

If another track of fiducial lines is desired on disk 26, micrometer screw 37 is adjusted to position the rotatable table 32, hence, disk 26, at a different radial distance between the center of shaft 10 to the electron beam 64 to define a different concentric circle or track about the previously machined track on the disk surface 26. The electronic counter is reset, and the foregoing process of machining is repeated.

With the encoder disks suggested by the present invention, the conventional tracks, consisting of larger fiducial marks as required may be produced by conventional techniques of photography of photoetching either prior to or subsequent to the machining process of the invention.

A second form of control apparatus for placing the coarse tracks on the encoder disk surface, and which can initially be used for machining the fine track, utilizes a programmed counter, a conventional pulse divider circuit and conventional logic circuit elements in the arrangement illustrated in FIGURE 4.

FIGURE 4 shows an electronic divider 100, capable of dividing by integral powers of two, connected at one desired dividend output terminal 2', as illustrated, to a bistable switch or flip flop 101. The input of the divider is connected to the output of and gate 102. Electronic divider 100 receives pulses at its input and is set to deliver a pulse at the termination of the requisite number of input pulses each time that the repetition of the requisite number occurs. Flip flop 101 is normally in its second state providing a signal output. This signal is applied to an input of and gate 103 through a delay circuit 104.

A conventional programmed electronic counter 105 is designed to provide a pulse at its output terminal upon the commencement of a predetermined number of input pulses as programmed in addition to indicating a count of the number of input pulses presented thereto. The input of counter 105 is connected to terminal A of electrical connector 45, illustrated in FIGURE 2, through which the pulses from shaft position encoder 35 are transmitted.

The output from the electronic counter 105 is connected to a bistable switch or flip flop 106. The output from flip flop 106 is connected to an input of and gate 103, and to an input of and gate 102. An additional input of and gate 102 is connected to terminal A to receive pulses from shaft position encoder 35 of FIGURE 2. And gate 102 has its output connected to the input terminal of electronic divider 100. The and gate, as is conventional, provides an output during coincidence of signals at its input.

A delay circuit 107 is connected at its input to terminal A, and at its output to an input of and gate 103. This circuit delays the application of input pulses from the encoder to and gate 103 by a small predetermined time.

During coincidence of signals at each of the three inputs, and gate 103 provides an output pulse. The output of and gate 103 is connected to a conventional a-stable or "one shot" multivibrator 108, which in turn is connected at its output to the input terminal 55 of the intensity control circuit of FIGURE 2. The "one shot" is provided to stretch the input pulse; that is, to provide an output pulse of a predetermined independent of the duration of the input pulse from and gate 103.

Delay circuit 104 delays slightly any change in the output of flip flop 101 from and gate 103. Delay circuit 107 delays the presentation of pulses appearing at input terminal A to and gate 103 to account for delay introduced by some of the switching time of the counter 105, divider 100, and the illustrated logic circuitry.

It is desired to commence machining to the second or subsequent tracks only at one predetermined angular position of the disk surface in order to provide for subsequently machined lines to be properly in alignment with the lines machined on the preceding tracks. This zero or reference position is deduced with the aid of the display on electronic counter 105, or counter 54 in FIGURE 2. Since there are only 262,144 distinct positions in a complete revolution of rotatable table 32 of the disclosed apparatus, each multiple of this number obviously represents the termination of a complete revolution of rotatable table 32 and disk surface 26; and each multiple of 262,145 represents the zero terminal or first position.

Thus, upon the completion of the machining of each track, represented by a count of 262,144 upon the electronic counter, the motor and intensity control circuit is deenergized by the operator. Movable table 32 is carried by its inertia past the zero position, and a count greater than 262,144 is displayed upon the electronic counter.

Micrometer positioning means 37 in FIGURE 2 is operated to linearly move table 30; hence, table 32 and disk surface a predetermined distance to be machined; that is, the axis of shaft 33 is moved closer to the aperture through which electron beam 64 is passed to define a circle or track upon revolution of disk surface 26 of smaller radius than the radius of the preceding track.

The apparatus disclosed in FIGURE 4 is connected between terminal A of connector 45 and input 55 of the intensity control circuit 56 in lieu of the connection and counter 54 therebetween shown in FIGURE 2. With reference to FIGURE 4, the electronic counter 105 is set to the count previously displayed upon counter 54 in the conventional manner and counter 105 is programmed to provide an output pulse on a subsequent count which is the next highest multiple of 262,145 than the count displayed upon counter 105.

The motor control circuit 67 and intensity control circuit 56 are again energized.

Flip flop 106 is normally in its first state, and therefore, does not provide a signal to and gate 102. Therefore, the square wave output pulses from shaft encoder 35 appearing at terminal A are inhibited, or in other words, do not pass through and gate 102. Consequently, divider 100 does not receive input pulses at its input at this time. Likewise, the pulses appearing at terminal A presented to the delay circuit 107 are inhibited at and gate 103. However, counter 105 receives and counts all such pulses.

Upon commencement of the predetermined count programmed upon counter 105, counter 105 provides an output pulse at its output. This output pulse triggers flip flop 106 to its second state. Flip flop 106 then provides an output voltage at one input of and gate 102, which is coincident with the major portion of the desired pulse which persists at terminal A to start electronic divider 100.

In like manner, flip flop 106 provides an output to an input of and gate 103. Since flip flop 101, as previously discussed, is normally in its second state providing a signal at a second input of and gate 103. Since the pulse from the shaft encoder appearing at terminal A is already present at the third input of and gate 103, the coincidence necessary for an output pulse from and gate 103 occurs and "one shot" 108 is triggered. Upon operation, "one shot" 108 provides a pulse which triggers intensity control circuit 56 of FIGURE 2 for a predetermined duration. This in turn removes the blocking potential from grid 63, and accordingly, the electron beam 64 is generated, and a line is machined at the zero position on disk surface 26.

Upon the appearance of a second pulse at terminal A, the counter 105 steps once, the divider 100 is prepared to divide, flip flop 106 hereinafter maintains its output at and gates 102 and 103, and coincidence at and gate 103 is again established. "One shot" again operates to trigger intensity control circuit 56, which effects machining of a second line.

Upon the termination of the second pulse an output pulse from divider 100 appears at its output terminal signifying a division by two. This output pulse triggers flip flop 101 to its first state, which in turn removes its output from an input of and gate 103 to inhibit "one shot" 108 and prevent further energization of intensity control circuit 56 of FIGURE 2; and hence, machining of lines.

At the termination of the second of the two pulses subsequently appearing at terminal A transmitted from the shaft position encoder 35, another output pulse appears at the output of divider 100, which signifies another division by two. This output triggers flip flop 101 back to its second state. Flip flop 101 provides an output which is delayed a short time by delay circuit 104, and presented to an input of and gate 103 to prepare and gate 103.

Upon the next two input pulses presented at terminal A, there is coincidence again occurring at the inputs of and gate 103, and the and gate each time triggers "one shot" 108. This in the previously discussed manner results in the machining of two more lines.

Thus, automatically in the foregoing example, a track is machined on the encoder disk surface that consists of a series of two lines followed by two spaces followed by two lines, etc.

As was noted, counter 105 counts all pulses appearing at terminal A, and upon the dipslay of the next succeeding multiple of 262,144 the machining of a complete track is again deduced. The motor control circuit 67, and intensity control circuit 57 are again disabled by the operator; and the movable table 32 allowed to stop. Flip flop 101 is reset to its first state and flip flop 106 to its second state by the operator in preparation for the machining of subsequent tracks.

A subsequent binary track to be machined requires the connection of the input of flip flop 101 to the 2² output terminal of divider 100, which represents a division by four, to provide a subsequent track on disk surface 26 that consists of four lines followed by four spaces, etc. In preparation for the machining of a subsequent track, the counter is preprogrammed to provide an output pulse at the commencement of the count which is the next highest multiple of 262,145 than the count presently displayed upon counter 105.

By selectively choosing the A dividend output terminal of divider 100, other tracks upon the disk surface 26 are machinable which contain four lines, followed by four spaces, followed by four lines; etc., eight lines followed by eight spaces; etc., to form the multitrack binary code pattern on the disk surface.

It is apparent that the control circuitry of FIGURE 4, although described as an alternative to that shown in FIGURE 2, and to the conventional photographic techniques of producing the more coarse tracks found upon a complete encoder disk surface, may also be used to machine the fine or first track upon the encoder disk surface.

Likewise, although one exemplary arrangement of conventional logic circuit elements is utilized in FIGURE 4, it is apparent to one of ordinary skill that other logic circuits can be substituted therefore to perform the same functions in a more or less refined manner, should it be desired or should the rotatable table be driven at high speeds and require these changes.

Of course it is understood that this invention is not restricted to the particular details described in the foregoing detailed description since many equivalents are apparent to those skilled in the art. The foregoing embodiments it is understood are presented solely for purposes of illustration and are not intended to limit the invention as defined within the breadth and scope of the appended claims.

What is claimed is:
1. Apparatus for machining fiducial marks of a microscopic width upon an encoder disk surface comprising in an evacuated shielded chamber:
 (A) electron beam means for generating an electron beam in a predetermined path, said electron beam having a predetermined cross-section and width;
 (B) aperture means having an aperture of a predetermined width, said width being smaller than the width of said electron beam and located in said path for passing a portion of said electron beam therethrough;
 (C) an encoder disk surface to be machined, said encoder disk surface located beneath said aperture means;
 (D) support means, including a:
 (E) first movable support for movably supporting said encoder disk surface and for placing a portion of said encoder disk surface beneath said aperture means in the path of said electron beam, and;
 (F) a second fixed support connected to said aperture means for mounting said aperture means proximate said encoder disk surface and in between said electron beam means and said encoder disk surface;
 (G) third support means carrying both said first and second supports;
 (H) electron beam control means connected to said electron beam means for controlling the generation and extinguishing of said electron beam;
 whereby a fiducial mark is produced without being blurred at its edges regardless of a peaked energy profile in the electron beam or of minute relative movement between the electron beam means and the disk surface caused by either electrical or mechanical tremor.

2. The invention as defined in claim 1, wherein said aperture comprises a straight slit.

3. The invention as defined in claim 1, further comprising:
 (I) driving means connected to said movable support means for rotating said movable support to different positions and exposing different portions of said encoder disk surface to said electron beam;
 (J) trigger means connected to said beam intensity control means and responsive to each predetermined movement of said movable support means for providing a trigger pulse to said beam control means.

4. The invention as defined in claim 3, wherein said driving means comprises:
 (K) a motion divider having an input shaft and an output shaft for dividing the input angular rotation coupled to its input shaft into a substantially smaller angular rotation of its output shaft, said driving means connected to said movable support means by said output shaft, and;
 (L) a motor coupled to said input shaft.

5. The invention as defined in claim 4, wherein said trigger means comprises:
 (M) shaft position encoder means, having an output circuit and an input shaft for providing an output pulse from its output circuit in response to each fractional rotation of its input shaft;
 (N) said input shaft of said encoder coupled to said input shaft of said motion divider for monitoring the movement of said movable support means;
 (O) said trigger means connected to said beam control means by said output circuit of said encoder means.

6. Apparatus for machining fiducial marks of sharp contrast upon a disk surface comprising in an evacuated shielded chamber:
 (A) electron beam means for generating an electron beam in a predetermined path, and said electron beam having a predetermined cross section and width;
 (B) aperture means having an aperture of a predetermined width, said width being smaller than the width of said electron beam and located in said path for passing a portion of said electron beam therethrough;
(C) support means, including:
(D) a first movable support having a portion thereof located beneath said aperture means for movably supporting a portion of a disk surface beneath said aperture means for exposure to said electron beam, and;
(E) a second fixed support connected to said aperture means for mounting said aperture means proximate said first movable support and in the path of said electron beam and third support means carrying both said first and second supports, and;
(F) beam control means connected to said electron beam means for controlling the generation and extinguishing of said electron beam,
whereby a fiducial mark is produced without being blurred at its edges regardless of a peaked energy profile in the electron beam or of minute relative movement between the electron beam means and the disk surface caused by either electrical or mechanical tremor.

7. The invention as defined in claim 6, wherein said aperture means comprises two blades each having a straight edge, and said edges are mounted parallel to each other and spaced from each other by less than two millionths of an inch.

8. The invention as defined in claim 7, wherein each of said edges is contoured along its depth.

References Cited

UNITED STATES PATENTS

| | | | |
|---|---|---|---|
| 3,118,050 | 1/1964 | Hetherington | 219—121 |
| 3,134,010 | 5/1964 | Bettermann et al. | 219—121 |
| 3,265,855 | 8/1966 | Norton | 219—121 |
| 3,266,393 | 8/1966 | Chitayat | 219—121 |
| 3,286,193 | 11/1966 | Koester et al. | 219—121 |

RICHARD M. WOOD, *Primary Examiner.*

W. DEXTER BROOKS, *Assistant Examiner.*

U.S. Cl. X.R.

219—121